(12) United States Patent
Bishop et al.

(10) Patent No.: US 11,550,052 B2
(45) Date of Patent: Jan. 10, 2023

(54) INTERFEROMETRIC SYNTHETIC APERTURE ACOUSTIC IMAGER

(71) Applicant: United States of America, as represented by the Secretary of the Army, Fort Belvoir, VA (US)

(72) Inventors: Steven S. Bishop, Fredericksburg, VA (US); Timothy R. Moore, Alexandria, VA (US); Peter M. Gugino, Fairfax Station, VA (US); Robert H. Luke, III, Alexandria, VA (US); Brett T. Smith, Arlington, VA (US); Mehrdad Soumekh, Bethesda, MD (US); Murray S. Korman, Annapolis, MD (US); Kathryn P. Kirkwood, Bel Air, MD (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 770 days.

(21) Appl. No.: 16/590,608

(22) Filed: Oct. 2, 2019

(65) Prior Publication Data
US 2020/0124721 A1   Apr. 23, 2020

Related U.S. Application Data

(60) Provisional application No. 62/746,590, filed on Oct. 17, 2018.

(51) Int. Cl.
*G01S 15/04* (2006.01)
*G01S 15/931* (2020.01)
*G01S 7/534* (2006.01)

(52) U.S. Cl.
CPC ............ *G01S 15/04* (2013.01); *G01S 15/931* (2013.01); *G01S 7/534* (2013.01)

(58) Field of Classification Search
None
See application file for complete search history.

(56) References Cited

U.S. PATENT DOCUMENTS

| 5,675,550 A | 10/1997 | Ekhaus |
| 6,130,641 A | 10/2000 | Kraeutner et al. |

(Continued)

FOREIGN PATENT DOCUMENTS

CN   102306234 A  *  1/2012

OTHER PUBLICATIONS

Bishop et al., "High-bandwidth acoustic detection system (HBADS) for stripmap synthetic aperture acoustic imaging of canonical ground targets using airborne sound and a 16 element receiving array," Proc. SPIE 10628, Detection and Sensing of Mines, Explosive Objects, and Obscured Targets XXIII, 106281J (Apr. 30, 2018).

*Primary Examiner* — Hovhannes Baghdasaryan
(74) *Attorney, Agent, or Firm* — Richard J. Kim

(57) ABSTRACT

An interferometric synthetic aperture acoustic imager is disclosed. Specifically, an acoustic imaging system includes an acoustic transmitter, an acoustic receiver array, a signal processing system, a navigation data system, and a meteorological data system. The acoustic transmitter and the acoustic receiver array are mounted on transceiver array. The navigation data system includes a Position and Orientation System for Land Vehicles system which receives data from two Global Positioning System antennas, an inertial measurement unit, and a wheel encoder mounted on a vehicle wheel. The system also includes meteorological data system that records temperature, relative humidity, and barometric pressure. The meteorological data may be used to (Continued)

adjust the received acoustic data based on atmospheric conditions.

11 Claims, 7 Drawing Sheets

(56) References Cited

U.S. PATENT DOCUMENTS

| | | | | |
|---|---|---|---|---|
| 2004/0078137 A1* | 4/2004 | Breakfield | ............ | G05D 1/0236 |
| | | | | 701/2 |
| 2010/0328142 A1* | 12/2010 | Zoughi | ................ | H01Q 13/103 |
| | | | | 342/179 |
| 2016/0341827 A1* | 11/2016 | Horner | .................... | G01S 15/89 |

* cited by examiner

INTERFEROMETRIC SYNTHETIC APERTURE ACOUSTIC IMAGER

CROSS-REFERENCE TO RELATED APPLICATIONS

This application claims priority to U.S. Provisional Patent Application No. 62/746,590, filed on Oct. 17, 2018, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

The present subject matter relates generally to devices that use audio waves to create interferometric data.

STATEMENT REGARDING PRIOR DISCLOSURES BY THE CO-INVENTORS

A presentation co-authored by Steven S. Bishop, Timothy R Moore, Peter Gugino, Brett Smith, Kathryn P. Kirkwood, Murray S. Korman (the co-inventors), entitled, "High-bandwidth acoustic detection system (HBADS) for stripmap synthetic aperture acoustic imaging of canonical ground targets using airborne sound and a 16 element receiving array," was published in Proc. SPIE 10628, Detection and Sensing of Mines, Explosive Objects, and Obscured Targets XXIII, 106281J (30 Apr. 2018), and is incorporated herein by reference.

BACKGROUND OF THE INVENTION

Sound waves are used to create images of underwater environments, which is commonly referred to as sonar. Further, radar is used to create images of terrestrial environments. However, the present inventors are unaware of any use of audio waves to collect interferometric data to image terrestrial environments.

SUMMARY OF THE INVENTION

The present invention broadly comprises a system and a method for collecting acoustic interferometric data. In one embodiment, an acoustic interferometric device includes an acoustic transmitter configured to emit sound waves in a direction, an acoustic receiver array configured to detect return sound waves from the direction, the acoustic receiver array including a plurality of acoustic receivers, a signal processing device configured to generate an interferometric image based on the return sound waves detected by the acoustic receiver array, and an output device configured to output the interferometric image to a user. Alternatively, said output device may be configured to output audio signals to a user based on the interferometric image.

In another aspect, an interferometric synthetic aperture acoustic imager is disclosed. Specifically, an exemplary acoustic imaging system includes an acoustic transmitter, an acoustic receiver array, a signal processing system, a navigation data system, and a meteorological data system. The acoustic transmitter and the acoustic receiver array are part of a transceiver array. The navigation data system includes a Position and Orientation System for Land Vehicles system which receives data from two Global Positioning System antennas, an inertial measurement unit, and a wheel encoder mounted on a vehicle wheel. The system also includes meteorological data system that records temperature, relative humidity, and barometric pressure. The meteorological data may be used to adjust the received data based on proximal atmospheric conditions.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
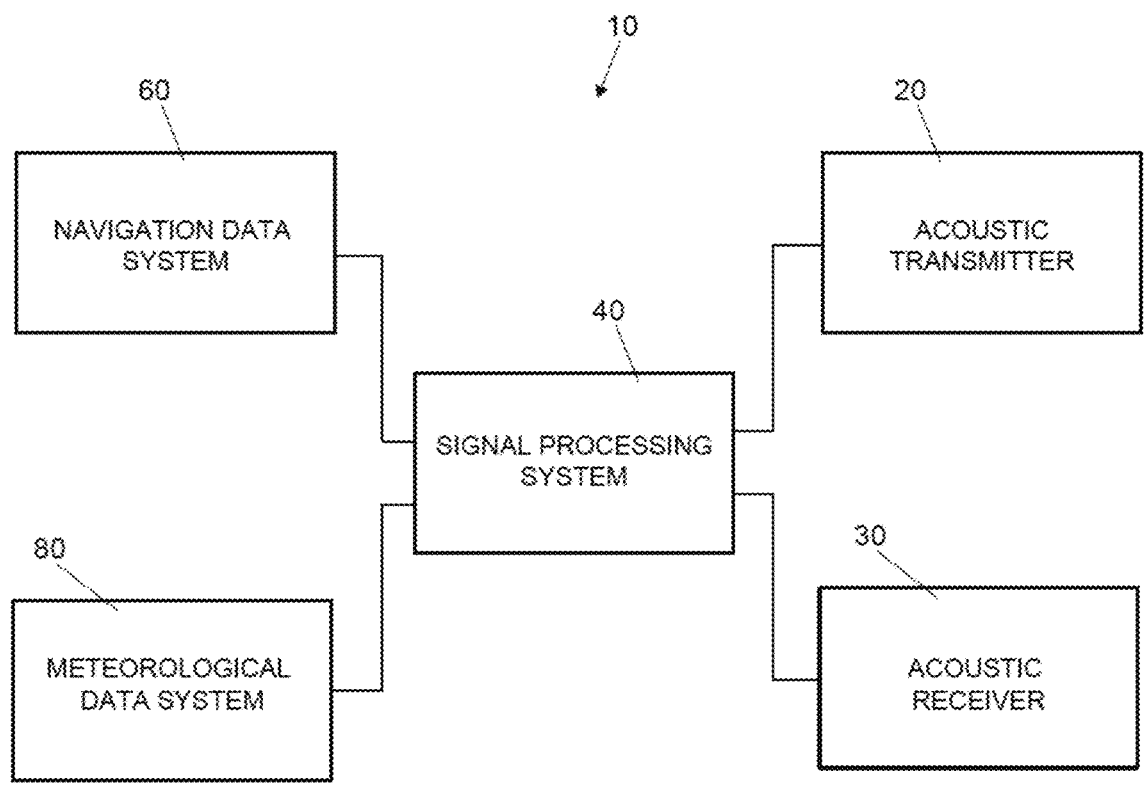
FIG. 1 illustrates a first embodiment of the present invention.

FIG. 1 illustrates acoustic imaging system 10 including acoustic transmitter 20, acoustic receiver array 30, signal processing system 40, navigation data system 60, and meteorological data system 80. Acoustic transmitter 20 and acoustic receiver array 30 are part of transceiver array 16 (shown in FIGS. 2 and 3). The navigation data system 60 includes a Position and Orientation System for Land Vehicles (POS LV) system 62 (located in the cabinet when mounted on a vehicle) which receives data from two Global Positioning System (GPS) antennae 64 (mounted on transceiver array 16), an inertial measurement unit (IMU) 66 (mounted on transceiver array 16), and a wheel encoder 68 mounted on a vehicle wheel. System 10 also includes meteorological data system 80 that records temperature, relative humidity, and barometric pressure. The meteorological data may be used to adjust the received acoustic data based on proximal atmospheric conditions.

Figure 2:
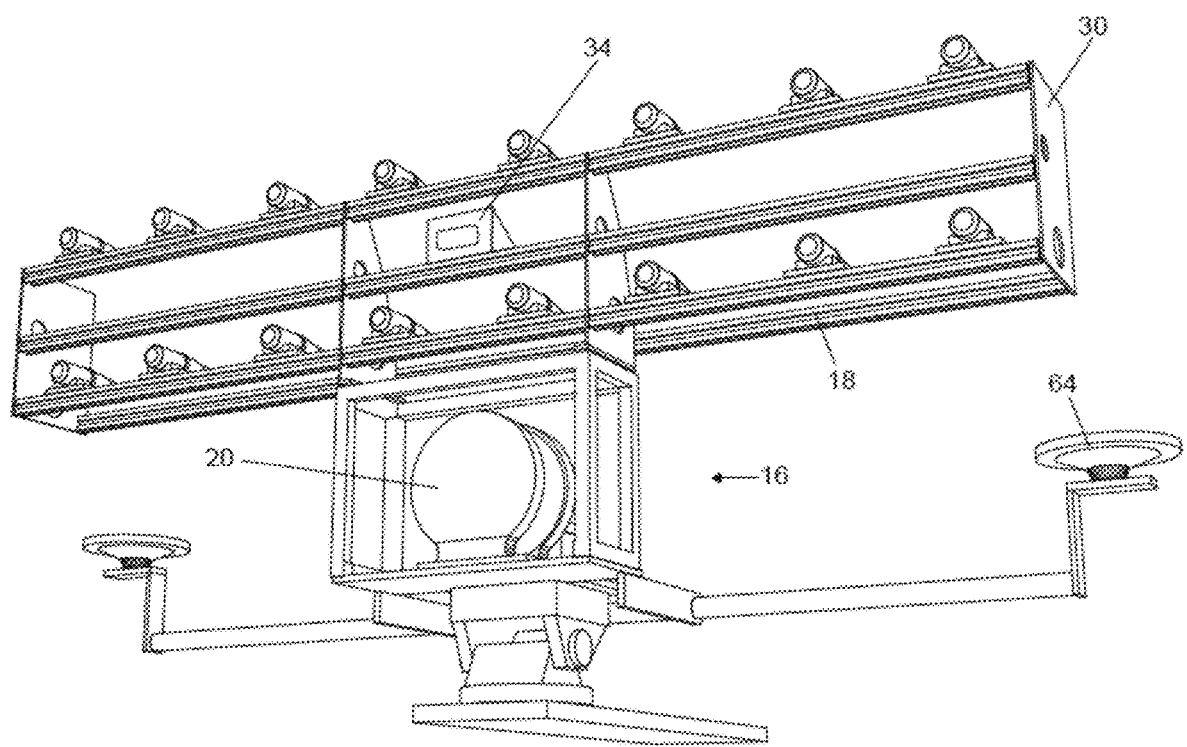
FIG. 2 shows the first embodiment of the present invention.
Figure 3:
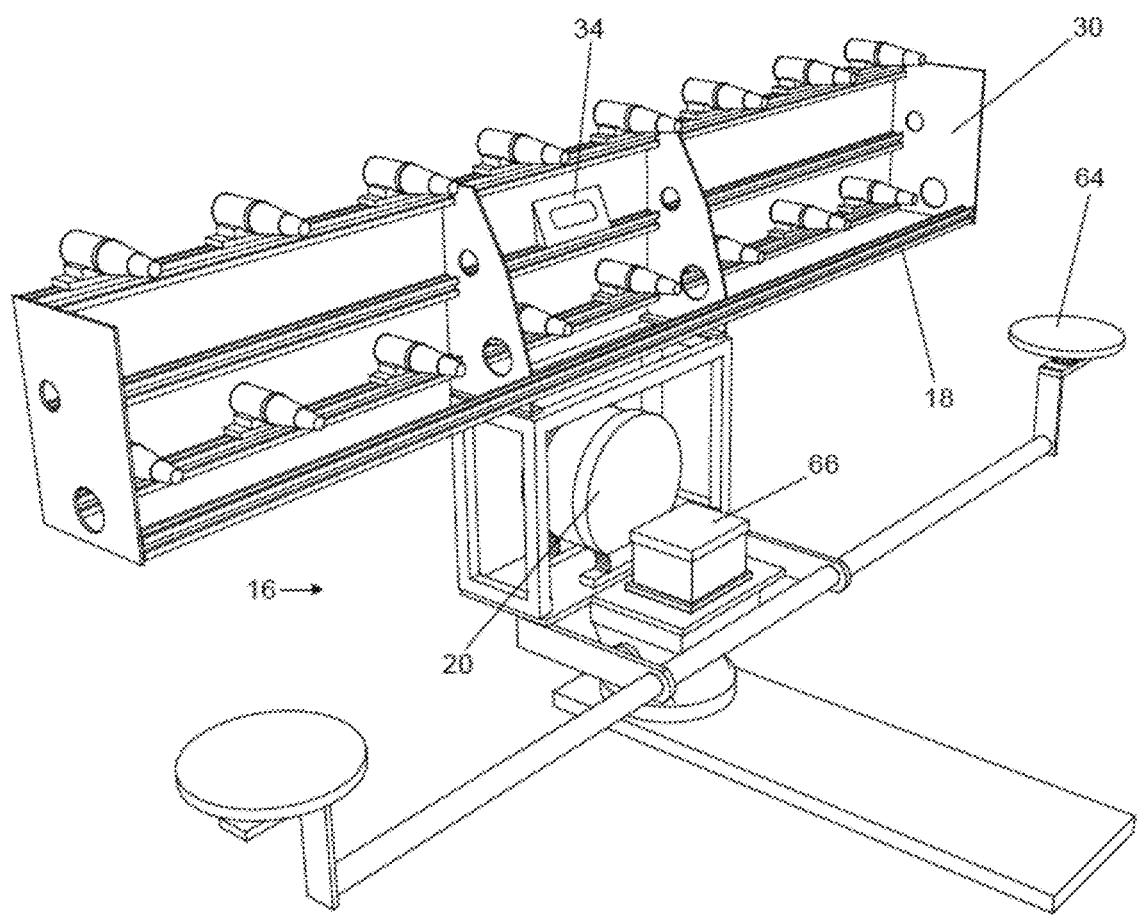
FIG. 3 shows a rear view of the first embodiment of the present invention.
Figure 4:
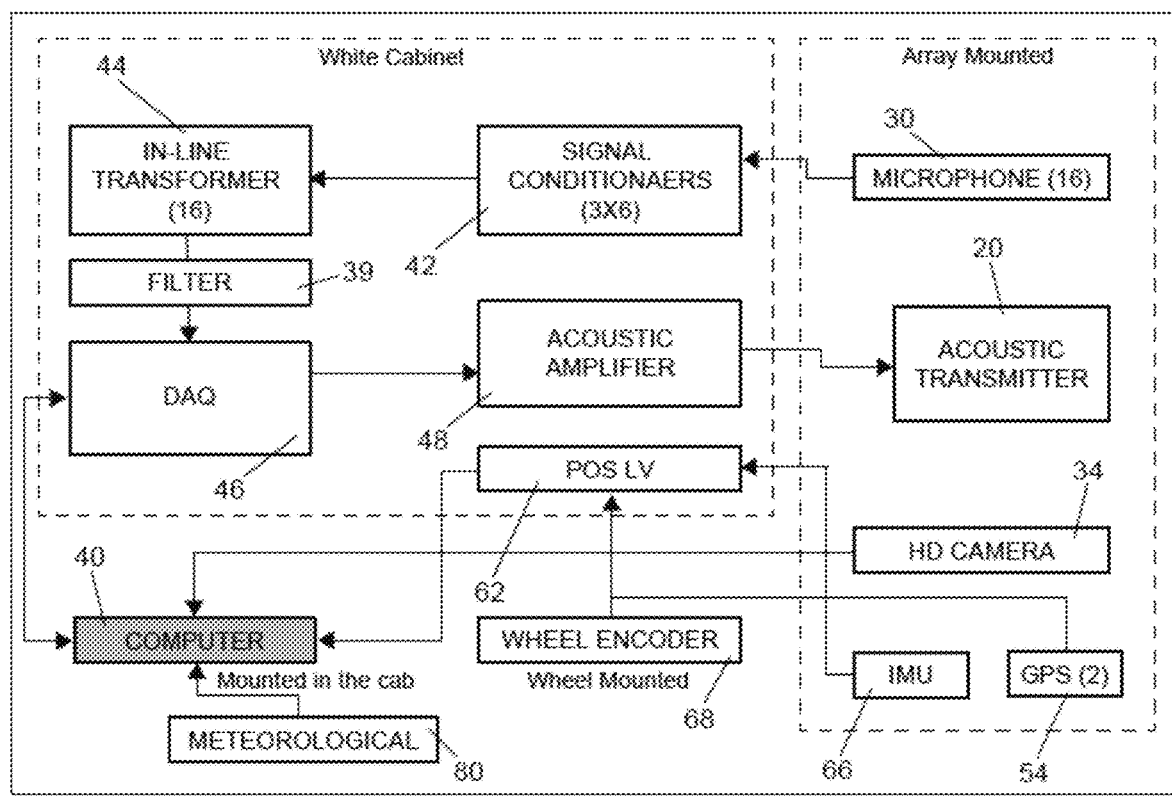
FIG. 4 illustrates a block diagram of components of the first embodiment of the present invention.

In the embodiment shown in FIGS. 2-4, acoustic transmitter 20 is a Pyramid™ TW67 car audio speaker. However, acoustic transmitter 20 may also be an infrasound transmitter, a sonic transmitter, and/or an ultrasound transmitter.

Acoustic receiver array 30 includes sixteen Neumann™ KM 131 directional microphones with eight microphones attached to each of two rails 18 (rails 18 are part of transceiver array 16). The microphones are separated by 15 cm horizontally and 20 cm vertically.

Transceiver array 16 also includes a camera 34. Mounted on the back of the vehicle is a cabinet including signal conditioners 42, in-line impedance transformers 44, data acquisition system (DAQ) 46, amplifier 48, microphone power supply, uninterruptable power supply, POS LV system 62, and two GPS receive antennae 64.

FIGS. 2 and 3 show portions of system 10 that could be mounted on the roof of a vehicle and within the vehicle, such as a John Deere® Military Gator 6×4. However, system 10 could be mounted on another vehicle, on the trailer of a vehicle, or on a stationary or human carried rack. Further, FIGS. 2 and 3 show acoustic receiver array 30 in a side swept configuration and movable between depression angles of −15 to −30° (below the horizontal). However, as noted above, array 30 could be side looking, partially forward looking, partially rearward looking, or not mounted on a vehicle or trailer. Moreover, array 30 could be fixed at a single angle, or movable between any range of depression angles. All these configurations are within the scope of the invention as claimed.

FIG. 4 shows an exemplary block diagram of the components of system 10 as mounted in and on the vehicle shown in FIGS. 2 and 3. FIG. 4 shows that a computer may be part of the signal processing system 40. FIG. 4 also shows that optional programmable filter 39 may be included between transformers 44 and DAQ 46.

Figure 5:
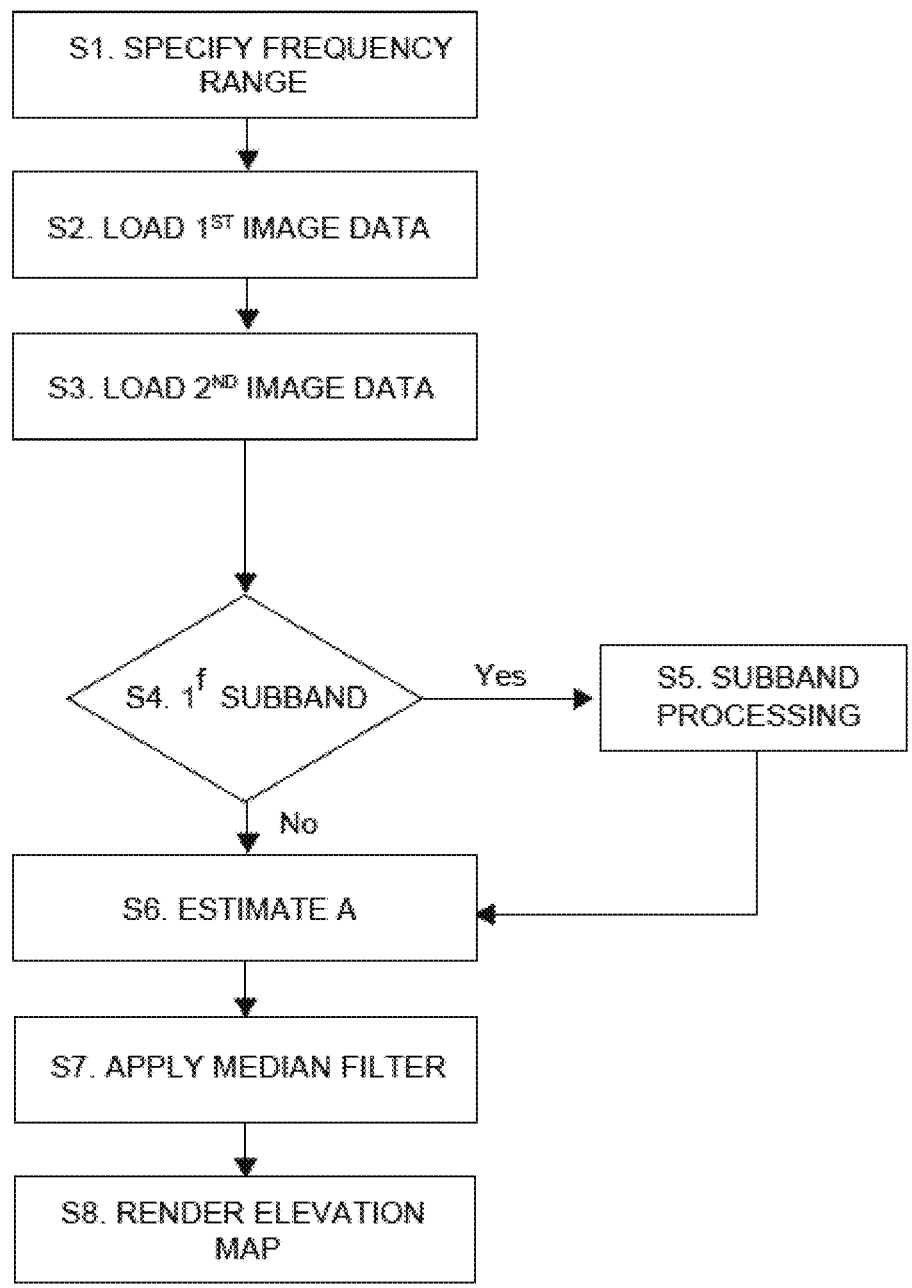
FIG. 5 shows a flow chart of the data processing of the first embodiment of the present invention.
Figure 6:
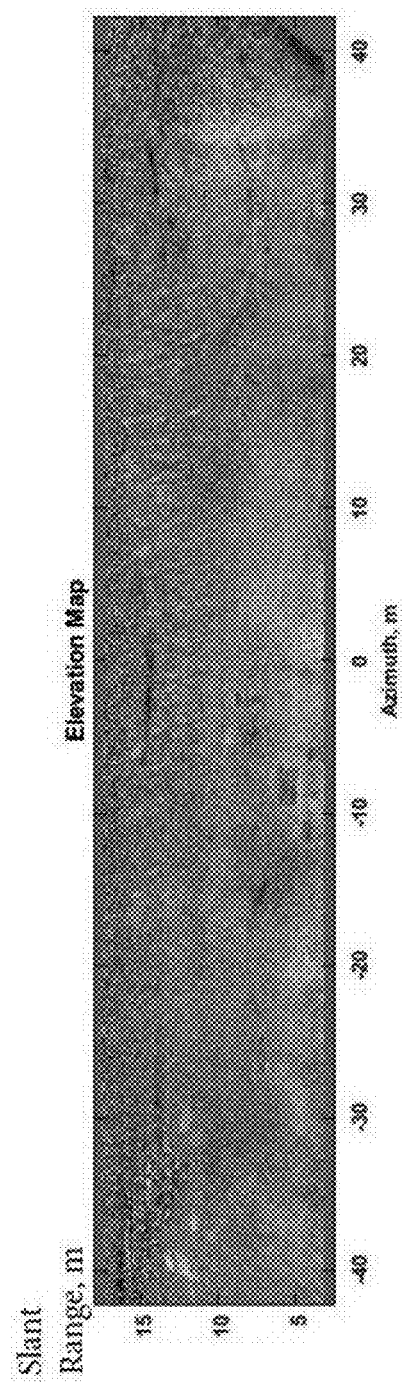
FIG. 6 shows an exemplary interferometric image generated by the first embodiment of the present invention.

FIG. 5 illustrates an exemplary non-real time processing flow. In step S1 (51), a user specifies a frequency range of interest by entering a maximum and a minimum frequency. This frequency range entered here will set the range of frequencies emitted by acoustic transmitter 20. This may be accomplished with a linear or non-linear frequency modulation (FM) chirp. In step S2 (52), data from a first half of the acoustic receiver array 30 is loaded as a first image, fa. The image data is in the Fourier domain. The first half of acoustic receiver array 30 is a single row of microphones, such as the top row of 8 microphones in FIG. 2. Step S3 (53) loads data from the second half of the acoustic receiver array as a second image, fb, such as the bottom row of 8 microphones in FIG. 2 which is also in the Fourier domain. Then step S4 (54) determines if sub band processing should be done in step S5 (55). Step S5 (55) processes the data from each image separately. The data may be processed only in a selected sub band of frequencies, such as 5-7 kHz. Step S6 (56) estimates the phase angle A by multiplying fa (the first image) by the conjugate of fb (the second image). Step S7 (57) applies a median filter on the phase angle A to generate B, the filtered phase angle. Step S8 (58) then creates an image of the values of B to generate an elevation map, as the phase angle is proportional to the elevation. Step S8 (58) also allows a user to adjust the intensity scale by choosing an upper and/or lower bound for values of the filtered phase angle B (values of B outside the specified range would not be imaged). An exemplary elevation map is shown in FIG. 6.

In one embodiment, the elevation map is generated after the data is collected, that is in non-real time. However, other embodiments generate the elevation map in real time.

Figure 7:
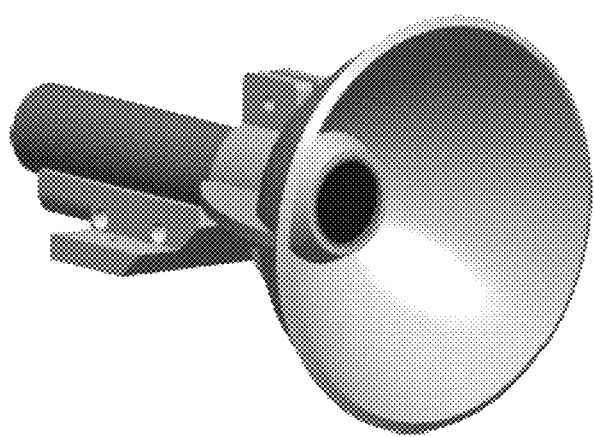
FIG. 7 illustrates an exemplary parabolic reflector of the present invention.

FIG. 7 illustrates an exemplary parabolic reflector for use with a single microphone. Each microphone in the array 30 may have such a reflector mounted thereon to increase the high frequency signal gain. The reflector should improve overall bandwidth, directionality, add a little more range resolution, and shift the center frequency higher.

Other embodiments of the present invention are also possible. In another embodiment, an acoustic interferometric device could provide audio output to aid a visually impaired individual. For example, the device could scan a nearby area for objects and provide a sound output based on any objects detected. In one embodiment, a high frequency tone indicates a close object, and lower frequency tones indicate further objects (the frequency of the tone being proportional to the distance of the detected object.)

Further, an acoustic interferometric device could be used to estimate the elastic properties of soft tissue. Also, outdoor materials could be assessed at standoff distances to enable rapid discrimination of faux coverings in specific and potentially critical scenarios. Finally, acoustic interferometric data could be fused with other sensor modalities such as radar and optical sensing.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An acoustic interferometric device comprising:
   an acoustic transmitter configured to emit sound waves in a direction;
   an acoustic receiver array configured to detect return sound waves from the direction, the acoustic receiver array including a plurality of acoustic receivers;
   a signal processing device configured to generate interferometric images based on the return sound waves detected by the acoustic receiver array; and
   an output device configured to provide an output for a user to detect an object based on the interferometric images, wherein said acoustic receiver array is comprised of a first set of directional microphones attached to a first rail of a transceiver array; and a second set of directional microphones attached to a second rail of the transceiver array, wherein said directional microphones are spaced 15 cm apart along the respective rail, whereas said first and second rails are parallel and separated 20 cm from each other.

2. The acoustic interferometric device according to claim 1, wherein said acoustic receiver array is configurable in a side swept position and movable between depression angles of −15 to −30° below the horizontal.

3. The acoustic interferometric device according to claim 1, wherein said acoustic receiver array can be configured partially forward looking, partially rearward looking, or not mounted on a vehicle or trailer, wherein said acoustic receiver array could be fixed at a single angle, or movable between any range of angles.

4. The acoustic interferometric device according to claim 1, wherein said transceiver array includes a camera.

5. An acoustic image processing method for an acoustic interferometric device comprising an acoustic transmitter configured to emit sound waves in a direction; an acoustic receiver array configured to detect return sound waves from the direction, the acoustic receiver array including a plurality of acoustic receivers; a signal processing device configured to generate interferometric images based on the return sound waves detected by the acoustic receiver array; and an output device configured to provide an output for a user to detect an object based on the interferometric images, the acoustic image processing method comprising the steps of:

specifying a frequency range of interest by entering a maximum frequency value and a minimum frequency value;

data from a first half of the acoustic receiver array is loaded as a first image;

data from a second half of the acoustic receiver array is loaded as a second image;

if sub band processing should be done, then process the data from each image separately;

estimate a phase angle value A by multiplying the first image fa by the conjugate of the second image fb;

apply a median filter on the phase angle values A to generate filtered phase angle B values; and generate an elevation map based on an image of the filtered phase angle B values.

6. The acoustic image processing method according to claim 5, wherein the first half of the acoustic receiver array is a first set of eight microphones of the acoustic receiver array.

7. The acoustic image processing method according to claim 5, wherein the second half of the acoustic receiver array is a second set of eight microphones of the microphone array.

8. The acoustic image processing method according to claim 5, wherein the phase angle A is estimated by use of the following relationship: Estimate phase angle A=((first image*conj(second image)).

9. The acoustic image processing method according to claim 5, wherein an image of the filtered phase angle B values is generated to generate an elevation map, as the phase angle is proportional to the elevation.

10. The acoustic image processing method according to claim 5, wherein an intensity scale is adjustable by choosing an upper and/or lower bound for the filtered phase angle B values.

11. The acoustic image processing method according to claim 10, wherein choosing an upper and/or lower bound for the filtered phase angle B values prevents imaging of the filtered phase angle B values falling outside of the respective bound.

* * * * *